United States Patent
Zamansky et al.

(10) Patent No.: US 6,471,506 B1
(45) Date of Patent: *Oct. 29, 2002

(54) METHODS FOR REDUCING $NO_x$ IN COMBUSTION FLUE GAS USING METAL-CONTAINING ADDITIVES

(75) Inventors: Vladimir M. Zamansky, San Clemente, CA (US); Peter M. Maly, El Toro, CA (US); Jerald A. Cole, Long Beach, CA (US); Vitali V. Lissianski, San Juan Capistrano, CA (US); William Randall Seeker, San Clemente, CA (US)

(73) Assignee: GE Energy & Environmental Research Corp., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,123

(22) Filed: Nov. 6, 2000

Related U.S. Application Data

(63) Continuation of application No. 09/387,631, filed on Aug. 31, 1999, now Pat. No. 6,206,685.

(51) Int. Cl.[7] .............................. F23J 7/00; F23J 15/00; B01D 53/34
(52) U.S. Cl. ............................................. 431/4; 431/10
(58) Field of Search ..................... 431/4, 8, 10; 60/723, 60/733; 422/172; 110/210, 344, 342, 345, 203

(56) References Cited

U.S. PATENT DOCUMENTS

| | | | |
|---|---|---|---|
| 3,900,554 A | 8/1975 | Lyon | 423/235 |
| 4,208,386 A | 6/1980 | Arand et al. | 423/235 |
| 4,331,638 A | 5/1982 | Michelfelder | 423/210 |
| 4,427,362 A | 1/1984 | Dykema | 431/4 |
| 4,824,441 A | 4/1989 | Kindig | 44/604 |
| 5,118,282 A | 6/1992 | Reynolds et al. | 431/4 |

(List continued on next page.)

FOREIGN PATENT DOCUMENTS

| | | |
|---|---|---|
| CA | 981019 | 1/1976 |
| DE | 3317504 | 11/1984 |
| GB | 2082314 | 3/1982 |
| JP | 53-439 | 1/1978 |
| JP | 53-77339 | 7/1978 |
| JP | 58-193013 | 11/1983 |
| JP | 59-150208 | 8/1984 |
| JP | 61-96318 | 5/1986 |
| JP | 4-136601 | 5/1992 |
| JP | 4-136602 | 5/1992 |

OTHER PUBLICATIONS

Richard K. Lyon and James E. Hardy, "Discovery and Development of the Thermal $DeNo_x$ Process," Ind. Eng. Chem, Fundam, vol. 25, No. 1, 1986, pp,. 19–24.

(List continued on next page.)

Primary Examiner—Carl D. Price
(74) Attorney, Agent, or Firm—Workman Nydegger Seeley

(57) ABSTRACT

Various methods for decreasing the amount of nitrogen oxides released to the atmosphere as a component of combustion gas mixtures are provided. The methods specifically provide for the removal of nitric oxide and nitrogen dioxide ($NO_x$) from gas mixtures emitted from stationary combustion systems. In particular, methods for improving efficiency of nitrogen oxide reduction from combustion systems include injecting metal-containing compounds into the main combustion zone and/or the reburning zone of a combustion system. The metal containing compounds react with active combustion species, and these reactions change radical concentrations and significantly improve $NO_x$ conversion to molecular nitrogen. The metal-containing additives can be injected with the main fuel, in the main combustion zone, with secondary or reburning fuel addition, or at several locations in the main combustion zone and reburning zone. Optionally, nitrogenous reducing agents and/or overfire air can be injected downstream to further increase $NO_x$ reduction.

22 Claims, 8 Drawing Sheets

U.S. PATENT DOCUMENTS

| | | | |
|---|---|---|---|
| 5,139,755 A | | 8/1992 | Seeker et al. ............... 423/235 |
| 5,176,088 A | | 1/1993 | Amrhein et al. ............ 422/169 |
| 5,270,025 A | | 12/1993 | Ho et al. .................... 423/235 |
| 5,443,805 A | * | 8/1995 | Beer et al. |
| 5,756,059 A | | 5/1998 | Zamansky et al. ....... 423/239.1 |
| 5,967,061 A | | 10/1999 | Ashworth et al. .......... 110/203 |
| 6,206,685 B1 | * | 3/2001 | Zamansky et al. ............. 431/4 |
| 6,213,032 B1 | * | 4/2001 | Breen et al. |

OTHER PUBLICATIONS

S. L. Chen, R. K. Lyon, and W. R. Seeker, "Advanced Non–Catalytic Post Combustion $No_x$ Control," Environmental Progress, vol. 10, No. 3, Aug. 1991, pp. 182–185.

Alan S. Feitelberg, "CET89 for the Macintosh: A Chemical Equilibrium and Transport Properties Calculator," General Electric Company (1994).

Vladimir M. Zamansky, Mark S. Sheldon and Peter M. Maly, "Enhanced $No_x$ Reduction by Interaction of Nitrogen and Sodium Compounds in the Reburning Zone," 27th International Symposium on Combustion, Aug. 2–7, 1998, Boulder, Colorado.

Vladimir M. Zamansky, Peter M. Maley, Loc Ho, Vitali V. Lissianski, Darwin Rusli and William C. Gardiner, Jr., "Promotion of Selective Non–Catalytic Reduction of NO by Sodium Carbonate," Apr. 1998.

Vladimir M. Zamasky, Peter M. Maly, and Loc Ho, "Family of Advanced Reburning Technologies: Pilot Scale Development," Proceedings of the 1997 ASME International Joint Power Generation Conference, Denver, Colorado, Nov. 2–5, 1997.

Vladimir M. Zamasky, Loc Ho, Peter M. Maly and W. Randall Seeker, "Reburninh Promoted by Nitrogen–and Sodium Containing Compounds," Presented at the 26th International Symposium on Combustion, Jul. 28–Aug. 2, 1996, Naples, Italy.

A. N. Hayhurst and A. D. Lawrence, "The Reduction of the Nitrogen Oxides NO and $N_2O$ to Molecular Nitrogen in the Presence of Iron, Its Oxides, and Carbon Monoxide in a Hot Fluidized Bed," Combustion and Flame, 110:351–365 (1997).

M. D. Rumminger, D. Reinelt, V. Babushok, and G. T. Linteris, "Numerical Study of the Inhibition of Premixed and Diffusion Flames by Iron Pentacarbonyl," Combustion and Flame 116:207–219, 1999.

* cited by examiner-

METHODS FOR REDUCING $NO_x$ IN COMBUSTION FLUE GAS USING METAL-CONTAINING ADDITIVES

This application is a continuation of U.S. application Ser. No. 09/387,631 filed on Aug. 31, 1999, now U.S. Pat. No. 6,206,685 B1.

BACKGROUND OF THE INVENTION

1. The Field of the Invention

The present invention is directed to processes for reducing nitrogen oxide emissions in combustion systems. More specifically, the present invention provides methods of decreasing the concentration of nitrogen oxides in flue gases emitted to the atmosphere from stationary combustion systems such as boilers, furnaces and incinerators.

2. The Relevant Technology

Nitrogen oxides are the major air pollutants emitted by boilers, furnaces, engines, incinerators, and other combustion sources. Nitrogen oxides include nitric oxide (NO), nitrogen dioxide ($NO_2$), and nitrous oxide ($N_2O$). Total $NO+NO_2$ concentration is usually referred to as $NO_x$. Combustion sources produce nitrogen oxides mainly in the form of NO. Some $NO_2$ and $N_2O$ are also formed, but their concentrations are typically less than 5% of the NO concentration, which is generally in the range of about 200–1000 ppm. Nitrogen oxides are the subject of growing concern because they are toxic compounds, and are precursors to acid rain and photochemical smog. Nitrous oxide also contributes to the greenhouse effect.

Combustion modifications such as low $NO_x$ burners (LNB) and overfire air (OFA) injection provide only modest $NO_x$ control, reducing $NO_x$ concentrations by about 30–50%. However, their capital costs are low and, since no reagents are required, their operating costs are near zero. For deeper $NO_x$ control, Selective Catalytic Reduction (SCR), reburning, Advanced Reburning (AR), or Selective Non-Catalytic Reduction (SNCR) can be used in conjunction with low $NO_x$ burners and overfire air injection, or they can be installed as stand-alone systems.

Currently, SCR is the commercial technology with the highest $NO_x$ control efficiency. With SCR, $NO_x$ is reduced by reactions with nitrogenous reducing agents (N-agents) such as ammonia, urea, etc., on the surface of a catalyst. The SCR systems are typically positioned at a temperature of about 700° F. in the exhaust stream. Although SCR can relatively easily achieve 80% $NO_x$ reduction, it is far from an ideal solution for $NO_x$ control. The size of the catalyst bed required to achieve effective NOx reduction is quite large, and use of this large catalyst, with its related installation and system modification requirements, is expensive to implement. In addition, catalyst deactivation, due to a number of mechanisms, typically limits catalyst life to about four years for coal-fired applications. The spent catalysts are toxic and pose disposal problems.

The reduction of $NO_x$ can proceed without a catalyst at a higher temperature. This is the SNCR process. It is effective over a narrow range of temperatures, or "temperature window" centered at about 1800° F. where the N-agent forms $NH_i$ radicals which react with NO. Under ideal laboratory conditions, deep $NO_x$ control can be achieved; however, in practical, full-scale installations, the non-uniformity of the temperature profile, difficulties of mixing the N-agent across the full combustor cross section, limited residence time for reactions, and ammonia slip (unreacted N-agent) limit SNCR's effectiveness. Typically, $NO_x$ control via SNCR is limited to 40–50%. Thus, while SNCR does not require a catalyst and hence has a low capital cost compared to SCR, it does not provide high efficiency $NO_x$ control. The most common SNCR N-agents are ammonia and urea, and the corresponding methods are called "Thermal $DeNO_x$" and "$NO_xOUT$."

The Thermal $DeNO_x$ process is described in detail in U.S. Pat. No. 3,900,554 to Lyon, and in Lyon and Hardy, "Discovery and Development of the Thermal DeNOx Process," *Ind. Eng. Chem. Fundam.*, 25, 19 (1986). When ammonia is injected into combustion flue gas containing NO and oxygen at temperatures between about 1500 and 2000° F., a series of chemical reactions occurs and NO is converted to molecular nitrogen. The reaction is believed to start with formation of $NH_2$ radicals by reaction of ammonia with OH, O or H atoms:

$$NH_3+OH \rightarrow NH_2+H_2O$$

$$NH_3+O \rightarrow NH_2+OH$$

$$NH_3+H \rightarrow NH_2+H_2$$

The main elementary reaction of the NO to $N_2$ conversion is then:

$$NH_2+NO \rightarrow N_2+H_2O$$

Another SNCR additive is urea, $(NH_2)_2CO$, which is disclosed in U.S. Pat. No. 4,208,386 to Arand et al., and is used in the $NO_xOUT$ process. When added to combustion flue gases, urea is rapidly thermally decomposed to $NH_3$ and HNCO:

$$(NH_2)_2CO \rightarrow NH_3+HNCO$$

Thus, the mechanism of urea reduction of $NO_x$ includes the reactions of $NH_3$ described above, as well as reaction of HNCO. The most important HNCO reactions with radicals are:

$$HNCO+H \rightarrow NH_2+CO$$

and $$HNCO+OH \rightarrow NCO+H_2O$$

As in the Thermal $DeNO_x$ process, $NH_2$ radicals can either remove NO:

$$NH_2+NO \rightarrow N_2+H_2O$$

or form NO by reaction with HNO radicals. NCO radicals can remove NO to form $N_2O$:

$$NCO+NO \rightarrow N_2O+CO$$

and then CO and $N_2O$ molecules are oxidized by OH and H, respectively:

$$CO+OH \rightarrow CO_2+H$$

$$N_2+H \rightarrow N_2+OH$$

Thus, the process has a similar narrow temperature window as $NH_3$ injection, but can be complicated by $N_2O$ formation. The SNCR temperature window could be broadened to lower temperatures if an alternative source of OH radicals could be found. Attempts to do this have included addition of hydrogen or hydrogen peroxide to ammonia, alcohols to urea, etc. The action of most additives is to shift the temperature at which the de-$NO_x$ reactions are optimum, rather than to broaden the de-$NO_x$ temperature window. However, U.S. Pat. No. 5,270,025 to Ho et al. discloses several salt additives that considerably broaden the temperature window of the Thermal DeNO$_x$ process.

An alternative to controlling $NO_x$ emissions by SCR or SNCR processes is reburning. Reburning is a method of controlling $NO_x$ emissions via fuel staging. The main portion of the fuel (80–90%) is fired through conventional burners with a normal amount of air (about 10% excess) in a main combustion zone. The combustion process forms a definite amount of $NO_x$. Then, in a second stage, the rest of the fuel (the reburning fuel) is added at temperatures of about 2000–2600° F. into the secondary combustion zone, called the reburning zone, to maintain a fuel-rich environment. In this reducing atmosphere both $NO_x$ formation and $NO_x$ removal reactions occur. Experimental results indicate that in a specific range of conditions (equivalence ratio in the reburning zone, temperature and residence time in the reburning zone), the $NO_x$ concentrations can typically be reduced by about 50–70%. In a third stage, air is injected (overfire air, or OFA) to complete combustion of the fuel. Addition of the reburning fuel leads to the rapid oxidation of a portion of the fuel by oxygen to form CO and hydrogen.

The reburning fuel provides a fuel-rich mixture with certain concentrations of carbon containing radicals: $CH_3$, $CH_2$, CH, C, HCCO, etc. These active species can participate either in the formation of NO precursors in reactions with molecular nitrogen or in reactions with NO. Many elementary steps can share responsibility for NO reduction, and there is no commonly accepted opinion about their relative importance. The carbon containing radicals ($CH_i$) formed in the reburning zone are capable of reducing NO concentrations by converting NO to various intermediate species with C—N bonds. These species are reduced in reactions with different radicals into $NH_i$ species ($NH_2$, NH, and N), which react with NO to form molecular nitrogen. Thus, NO can be removed by reactions with two types of species: $CH_i$ and $NH_i$ radicals. The OFA added in the last stage of the process oxidizes remaining CO, $H_2$, HCN, and $NH_3$ and unreacted fuel and fuel fragments. The reburning fuel can be coal, gas or other fuels.

The Advanced Reburning (AR) process is a synergistic integration of reburning and SNCR, and is disclosed in U.S. Pat. No. 5,139,755 to Seeker et al. In the AR process, an N-agent is injected along with the OFA, and the reburning system is adjusted to optimize $NO_x$ reduction by the N-agent. By adjusting the reburning fuel injection rate to achieve near stoichiometric conditions (instead of the fuel rich conditions normally used for reburning), the CO level is controlled and the temperature window for effective SNCR chemistry is considerably broadened. With AR, the $NO_x$ reduction achieved from the N-agent injection is increased. Furthermore, the widening of the temperature window provides flexibility in locating the injection system, and $NO_x$ control should be achievable over a broad boiler operating range.

The Advanced Reburning process provides an approach for increasing the OH concentration to form $NH_2$ radicals from N-agents. It incorporates the chain branching reaction of CO oxidation into the process. When CO reacts in the presence of oxygen and water vapor ($H_2O$), it creates free radicals including H, OH, O and $HO_2$. Thus, if a controlled amount of CO from the reburning zone can be introduced at the point of N-Agent injection, the low temperature limitation of the window can be broadened and the $NO_x$ reduction enhanced.

Experimental studies have demonstrated two approaches for addition of OFA in reburning to prepare specific SNCR conditions. (Chen et al., "Advanced Non-Catalytic Post Combustion $NO_x$ Control," Environ. Progress, 10, 182 (1991)). One approach is to split the OFA addition and inject it in two stages so that the bulk of the oxidation is completed at the conventional OFA injection stage while a moderate amount of CO is left for burnout at a second injection stage at lower temperature where conditions are more favorable for DeNO$_x$ reactions. In an alternative approach, the reburning zone is deliberately de-tuned by increasing the stoichiometry to about 0.98–1.0.This allows a significant reduction in the reburning fuel flow, and eliminates one of the air injection stages. The basic AR process, i.e., CO-promoted N-Agent injection, shows that the temperature window can be broadened and NO removal efficiency increased if both CO and $O_2$ concentrations are controlled to fairly low values (CO on the order of about 1000 ppm, and $O_2$ at less than about 0.5 percent). At the point of air addition, CO and $O_2$ are both low because of the close approach to SR=1.0.

U.S. Pat. No. 5,756,059 to Zamansky et al. discloses an improved Advanced Reburning process in which the N-agent can be injected under fuel rich conditions or at two injection locations, one each under fuel-rich and fuel-lean conditions, for deeper $NO_x$ control. The N-agent can be injected with or without promoters at one or two locations in the reburning zone, along with OFA or downstream in the burnout (SNCR) zone. The promoters are water-soluble inorganic salts that can be added to aqueous N-agents, or to solid, liquid or gaseous N-agents, and injected along with the N-agents to enhance the N-agent efficiency. In pilot scale AR experiments, $NO_x$ reduction of up to 95% was achieved. The estimated total cost of $NO_x$ control for AR systems is approximately half of that for SCR.

The chemistry of AR is no different than that for basic reburning and SNCR, and the reactions discussed above proceed. The critical difference is how the two sets of chemical reactions are synergistically integrated together. The final OFA initiates the oxidation of CO from the reburning zone:

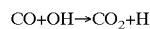

$$CO+OH \rightarrow CO_2+H$$

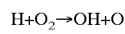

$$H+O_2 \rightarrow OH+O$$

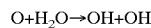

$$O+H_2O \rightarrow OH+OH$$

This chain branching sequence provides additional OH radicals to initiate the $NH_3$ oxidation sequence:

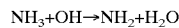

$$NH_3+OH \rightarrow NH_2+H_2O$$

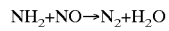

$$NH_2+NO \rightarrow N_2+H_2O$$

While prior systems are capable of controlling $NO_x$ emissions, even the most effective systems are still complex. In addition, effective $NO_x$ reduction systems can be expensive to implement, operate and maintain. Thus, there is a need for simpler, less expensive, and effective processes for reducing the $NO_x$ concentration in combustion flue gases.

SUMMARY AND OBJECTS OF THE INVENTION

It is an object of the present invention to provide methods for decreasing the concentration of $NO_x$ in combustion flue gases before the gases are emitted to the atmosphere.

It is another object of the present invention to provide relatively simple and inexpensive methods for decreasing the concentration of $NO_x$ in combustion flue gases.

It is another object of the present invention to improve the efficiency of $NO_x$ removal in conventional reburning processes.

These and other objects and advantages are achieved by providing methods for removal of nitrogen oxides from combustion flue gas wherein the combustion flue gas is contacted with certain metal-containing additives which advantageously and surprisingly reduce $NO_x$ alone or in conjunction with conventional $NO_x$ removal processes.

In one method according to the present invention, the concentration of nitrogen oxides in a combustion flue gas is decreased by providing a metal-containing additive in the main combustion zone. This method includes the steps of: providing a combustion zone for oxidizing a combustible fuel with an oxidizing agent, the combustion forming a combustion flue gas that contains nitrogen oxides; introducing a metal-containing additive in the combustion zone (separately or with fuel or air); and allowing the metal-containing additive to react within the combustion flue gas to decrease the concentration of nitrogen oxides therein.

In another method according to the present invention, the concentration of nitrogen oxides in a combustion flue gas is decreased by providing a metal additive in the reburning zone. This method includes the steps of: providing a combustion zone for oxidizing combustible fuel with an oxidizing agent, the combustion forming a combustion flue gas that contains nitrogen oxides; adding a reburning fuel to the combustion flue gas in a reburning zone; introducing a metal-containing additive in the reburning zone (separately or with the reburning fuel); and allowing the metal-containing additive to react within the combustion flue gas to decrease the concentration of nitrogen oxides therein. It has been surprisingly found that addition of a metal-containing additive in the reburning zone is effective to reduce $NO_x$ in the absence of N-agents. Optionally, an N-agent and/or overfire air can be added to the combustion flue gas downstream of the reburning zone to further increase $NO_x$ control.

In another method according to the present invention, the concentration of nitrogen oxides in a combustion flue gas is decreased by providing a metal additive in both the combustion and reburning zones. This method includes the steps of: providing a combustion zone for oxidizing a combustible fuel with an oxidizing agent, the combustion forming a combustion flue gas containing nitrogen oxides; introducing a first metal-containing additive in the combustion zone; allowing the first metal-containing additive to react within the combustion flue gas to decrease the concentration of nitrogen oxides therein; adding a reburning fuel to the combustion flue gas to form a reburning zone; introducing a second metal-containing additive in the reburning zone; and allowing the second metal-containing additive to react within the combustion flue gas to further decrease the concentration of nitrogen oxides therein. Both metal additives can be added separately or with combustion reagents.

These and other objects, features, and advantages of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to the appended drawings. Understanding that these drawings are not to be considered limiting of its scope, the invention will be described and explained with additional specificity and detail through the use of the accompanying drawings in which.

DETAILED DESCRIPTION OF THE INVENTION

Figure 1:
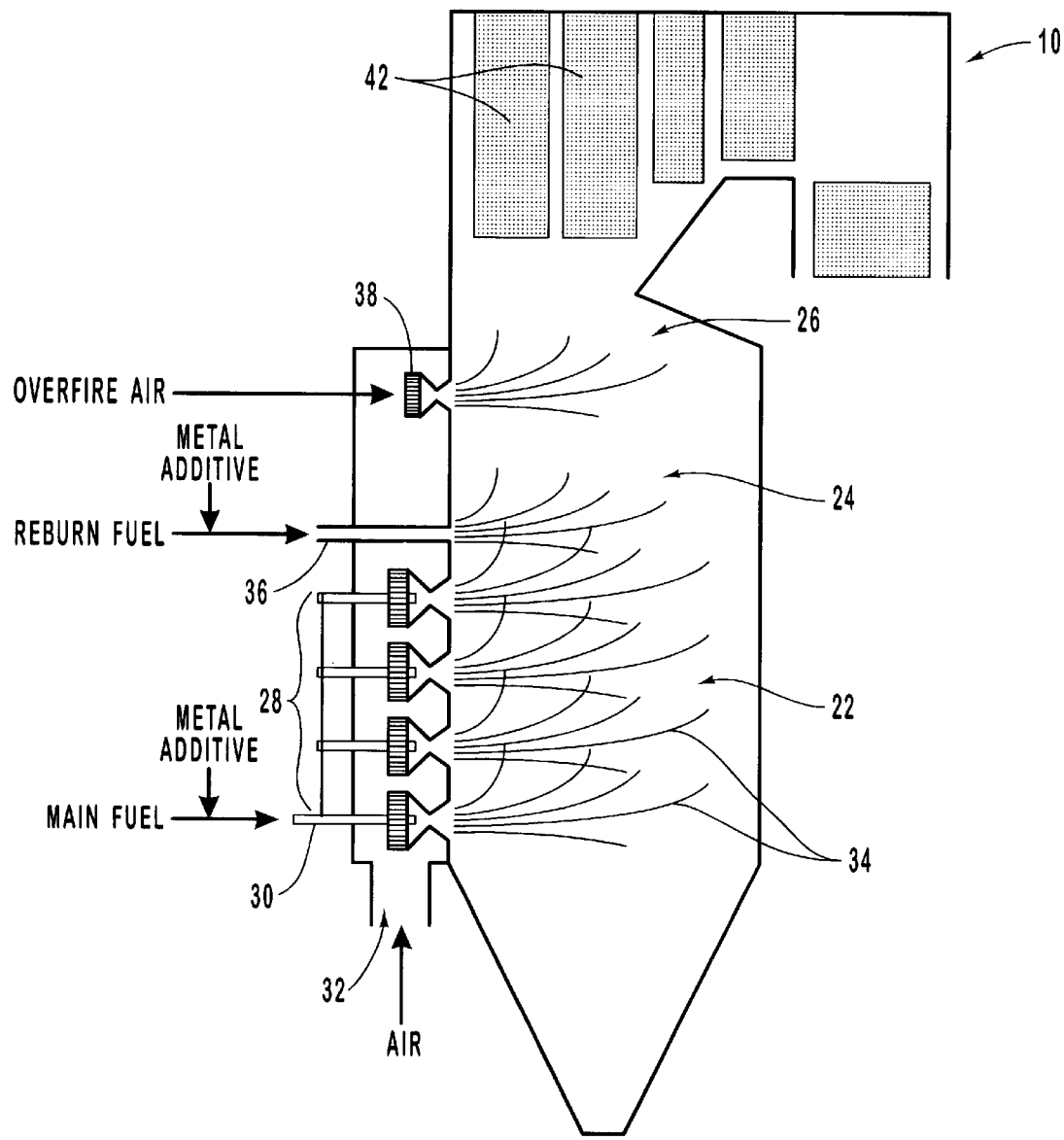
FIG. 1 is a schematic representation of a conventional coal-fired combustion device adapted for a method of the present invention.

As will be appreciated by consideration of the following description as well as the accompanying figures, the present invention may be embodied in different forms. The embodiments described herein represent demonstration modes for carrying out the methods of the invention. Nevertheless, many embodiments, or variations of them, other than those specifically detailed herein, may be used to carry out the methods described herein.

The methods of the invention provide for improving the efficiency of nitrogen oxide reduction from combustion systems. The methods generally include injecting metal-containing compounds into the main combustion zone and/or the reburning zone of a combustion system. The metal containing compounds react with active combustion species, and these reactions change radical concentrations and significantly improve $NO_x$ conversion to molecular nitrogen. As discussed in further detail below, the metal-containing additives can be injected with the main fuel, in the main combustion zone, with secondary or reburning fuel addition, or at several locations in the main combustion zone and reburning zone.

As used herein, the terms "nitrogen oxides" and "$NO_x$" are used interchangeably to refer to the chemical species nitric oxide (NO) and nitrogen dioxide ($NO_2$). Other oxides of nitrogen are known, such as $N_2O$, $N_2O_3$, $N_2O_4$ and $N_2O_5$, but these species are not emitted in significant quantities from stationary combustion sources (except $N_2O$ in some systems). Thus, while the term "nitrogen oxides" can be used more generally to encompass all binary N—O compounds, it is used herein to refer particularly to the NO and $NO_2$ (i.e., $NO_x$) species.

It is a particular feature of the present invention that the methods described herein can be carried out using a wide variety of conventional combustion devices. Thus, any combustion device that includes a combustion zone for oxidizing a combustible fuel can be used. For example, the combustion zone may be provided in a power plant, boiler, furnace, magnetohydrodynamic (MHD) combustor, incinerator, engine, or other combustion device. Combinations of such combustion devices are also suitable.

In one method according to the present invention, the concentration of nitrogen oxides in a combustion flue gas is decreased by providing a metal-containing additive in the main combustion zone. This method includes providing a main combustion zone for oxidizing a combustible fuel with an oxidizing agent, with the combustion forming a combustion flue gas that contains nitrogen oxides. A metal-containing additive is introduced into the combustion zone separately or with reagents (e.g, fuel or air), and is allowed to react within the combustion flue gas to decrease the concentration of nitrogen oxides therein.

The combustion zone is adapted to oxidize a combustible fuel with an oxidizing agent, thereby generating a combustion flue gas. The combustible fuel can be a solid, liquid, or gaseous fuel, such as coal, oil, natural gas, biomass, combustible waste products such as municipal or industrial waste, and other combustibles. Similarly, the oxidizing agent is typically air, but can be recirculated flue gas, oxygen, or any oxygen-containing gas. Oxidation of the combustible fuel by the oxidizing agent generates a complex mixture of chemical species, including nitrogen oxides. Preferably, the temperature in the combustion zone is about 1500° F. to about 3500° F., and the combustible fuel and oxidizing agent are provided to the combustion zone in a stoichiometric ratio (SR) of about 1.30 to about 0.75.

The metal-containing additives provided in the combustion zone have been surprisingly found to decrease the $NO_x$ concentration in the combustion flue gas by affecting processes of $NO_x$ formation and/or destruction. Suitable metal-containing additives include compounds of lithium, sodium, potassium, magnesium, barium, calcium, zinc, aluminum, manganese, iron, cobalt, nickel, copper, molybdenum, ruthenium, rhodium, palladium, silver, gold, cadmium, indium, tin, osmium, iridium, chromium, titanium, vanadium, cesium and platinum. Specific compounds include oxides, hydroxides, carbonates, and other inorganic or organic salts, and metal-containing organic compounds such as acetates, citrates, gluconates, metalorganics, and the like. The above metals which are stable in air can also be added in their elemental form if desired. Alloys of the above listed metals, as well as combinations and mixtures of the metals and/or metal-containing compounds can be used. The additives can be also natural products, waste products, fuels, and other substances which include the above listed metals. However, sulfides, silicates and aluminosilicates present in coals and other fossil fuels have been found to be not particularly effective, and are not preferred.

The metal-containing additives can be provided as solids (e.g., particulate), liquids (especially metal-organic compounds), molten liquids, or as solutions, suspensions or slurries of metal compounds in water or other solvents or carriers. The additives can be also constituent parts of the combustible fuel, or products of its pyrolysis or gasification. For example, the additives can be formed from one or more precursors that are constituent parts of a fuel, or formed or released from a fuel by a process such as pyrolysis, gasification, physical separation, or chemical separation.

The amount of additives in the combustion zone can be in the range of about 1 ppm to about 10,000 ppm in the combustion flue gas, and is preferably in the range of about 10 ppm to about 2000 ppm. The amounts in units of ppm are based on the molar concentration of the metal-containing additive. Solid particles of the additives can be removed from flue gas downstream by particulate control devices. High concentrations of additives are not preferred, since consumption of large amounts of the additives is economically disadvantageous, and additionally increases the load on particulate control devices. On the other hand, the amount of additives should be high enough to enhance $NO_x$ reduction. One of skill in the art can readily determine the optimal amount of a particular metal-containing additive by the methods described in the Examples herein.

The average size of the additive particles can range from about 0.1 $\mu$m to about 10,000 $\mu$m, preferably about 1 $\mu$m to about 1000 $\mu$m. The particles should be small enough to provide for rapid heating thereof in the high temperature flame followed by physical and chemical processes, such as evaporation and destruction of some metal-containing compounds. In addition, small particles provide high surface area that may result in increased $NO_x$ reduction via reactions on the surface. Injection of excessively small particles, however, will reduce penetration of the metal-containing additive into the combustion zone, which may limit its effectiveness.

The metal-containing additive can be provided to the combustion zone in various ways. For example, the metal-containing additive can be premixed with the combustible fuel, or can be provided separately, such as by injecting directly into the combustion zone. Alternatively, the metal-containing additive can be injected into the combustion zone along with an oxidizing agent, such as an air stream. Other variations can be used as desired. For example, a portion of the metal-containing additive can be injected with the combustion fuel and another portion injected with the oxidizing agent. The metal-containing additive can be injected in one or more locations in the combustion zone, with or without the combustible fuel or oxidizing agent. The metal-containing additive can be distributed in conventional ways for injection, such as, for example, by nitrogen, steam, air, recirculation gases or mixtures thereof. The metal-containing additive is allowed to react with the combustion flue gas for a suitable time period such as from about 0.01 to about 10 seconds.

Downstream of the combustion zone, the combustion flue gases, now partially depleted of $NO_x$ by reaction with the metal-containing additive, can be further treated as desired. For example, reburning and/or N-agent reduction processes can be utilized to further treat the downstream combustion flue gases.

In another method according to the present invention, the concentration of nitrogen oxides in a combustion flue gas is decreased by providing a metal additive in the reburning zone. This method includes providing a main combustion zone for oxidizing a combustible fuel with an oxidizing agent, with the combustion forming a combustion flue gas that contains nitrogen oxides. A reburning fuel is added to the combustion flue gas downstream from the combustion zone to form a reburning zone. A metal-containing additive is introduced into the reburning zone either separately or along with the reburning fuel, and is allowed to react within the combustion flue gas to decrease the concentration of nitrogen oxides therein. In this method, the combustion zone, combustible fuel and oxidizing agent, metal-containing additives and their size and concentration, etc., are as described above. However, the metal-containing additive is provided in the reburning zone, rather than in the combustion zone. It has been surprisingly found that significant $NO_x$ reduction can be achieved by providing a metal-containing additive in the reburning zone, without the need to also provide an N-agent.

The reburning fuel can be any of the combustible fuels described above. The amount of reburning fuel added can be about 1% to about 30% of the total fuel supply, and is preferably about 5% to about 20%. The metal-containing additive can be premixed with the reburning fuel, injected with the reburning fuel stream, or injected separately into the reburning zone.

If desired, OFA can be injected downstream of the reburning zone in one or more stages, to provide more complete combustion. By "downstream" is meant in the direction of flow of the combustion flue gas, from the main combustion zone to the reburning zone. In addition, as the combustion flue gas flows out of the reburning zone, the temperature of the gas decreases. Thus, downstream of the reburning zone also corresponds to a lower temperature zone. The temperature of the reburning zone for injection of reburning fuels can vary from about 1500° F. to about 3000° F. This temperature range is used currently in various applications of reburning. The average fuel/oxygen stoichiometric ratio ("SR") in the reburning zone can vary from about 1.1 to about 0.75, and is preferably about 1.05 to about 0.80. However, even under total fuel-lean conditions (i.e., SR about 1.00 to about 1.1), large zones with incompletely mixed fuel and oxygen exist, and $NO_x$ control via reburning reactions proceeds in these zones. Therefore, if the SR is greater than unity (fuel-lean conditions) injection of OFA may not be preferred. Pressure is not an important parameter for efficiency of reburning reactions, and it can vary depending on application from about 0.2 to about 80 atm.

The time period between injections of the reburning fuel and optional injection of OFA (residence time in the reburning zone) is an important factor which affects process efficiency. Typically, available residence time in coal fired boilers is in a range from about 0.3 to about 1.2 seconds. Depending on temperature profiles, the residence time should be kept as long as possible to complete the reactions in the reburning zone. However, excessively low OFA injection temperature will increase concentrations of CO and other combustibles in the combustion flue gas. Therefore, the temperature range for OFA injection in the burnout zone should be from about 1100° F. to about 2500° F.

If desired, N-agents can be provided to further increase $NO_x$ reduction. If used, the N-agents can be injected in gaseous, solution or slurry form downstream of the metal-containing additives and the reburning zone, preferably in a region at a temperature range from about 1100° F. to about 2300° F. The molar ratio of the N-agent to $NO_x$ can be about 0.5 to about 3. It has been found that the effect of N-agents is enhanced by the presence of the metal-containing additives injected upstream. Suitable N-agents are known in the art, and include, for example, ammonia, urea, cyanuric acid, ammonium sulfate, hydrazine, thanolamine, ammonium bisulfite, ammonium bisulfate, ammonium formate, ammonium carbonate, ammonium bicarbonate, biuret, triuret, ammelide, and mixtures thereof.

Alternatively, both N-agents and OFA as described above can be injected downstream of the reburning zone.

In another method according to the present invention, the concentration of nitrogen oxides in a combustion flue gas is decreased by providing metal additives in both the combustion and reburning zones. This method includes providing a combustion zone for oxidizing a combustible fuel with an oxidizing agent, with the combustion forming a combustion flue gas containing nitrogen oxides. A first amount of a metal-containing additive is introduced into the combustion zone, and is allowed to react within the combustion flue gas to decrease the concentration of nitrogen oxides therein. A reburning fuel is added to the combustion flue gas downstream from the combustion zone to form a reburning zone. A second amount of a metal-containing additive is introduced into the reburning zone, and is allowed to react within the combustion flue gas to further decrease the concentration of nitrogen oxides therein. Thus, this method combines the two previous methods described above for more complete $NO_x$ control. Preferably, the total amount of metal-containing additive provided is about 1 ppm to about 10,000 ppm, more preferably about 10 ppm to about 2000 ppm. The first and second metal-containing additives can include those materials described above and can be either the same or different materials.

Referring to the drawings, FIG. 1 is a schematic depiction of a coal-fired boiler 10 that can be used to perform the various methods of the invention described above. The boiler 10 includes a main combustion zone 22, a reburning zone 24, and a burnout zone 26. The combustion zone 22 is equipped with a plurality of main burners 28 which are supplied with a main fuel such as coal and air through a fuel input 30 and an air input 32, respectively. The main fuel such as coal is burned in burners 28 in the presence of air, to form a combustion flue gas 34 that flows in a downstream direction from combustion zone 22 to reburning zone 24. For example, about 85% of the total heat input can be supplied by main burners 28. The reburn fuel such as natural gas is injected through reburn fuel input 36 and provides the remaining heat input. The metal-containing additives can be injected with the main fuel in the combustion zone 22, or can be injected with the reburn fuel in the reburning zone 24, or can be injected in both zones, as described above. For example, metal-containing additives can be introduced into the reburn fuel such as in powder form prior to reburn fuel injection, and distributed through reburning zone 24 with the stream of reburn fuel. Injection of the metal-containing additives results in a higher level of $NO_x$ reduction than in conventional reburning. In burnout zone 26, overfire air is injected if desired through an overfire air port 38 to complete combustion. The flue gas passes through a series of heat exchangers 42 and the solid additives are removed downstream by a particulate control device (not shown), such as an electrostatic precipitator (ESP) or baghouse.

The following examples are given to illustrate the methods and systems of the present invention, and are not intended to limit the scope of the present invention.

EXAMPLE 1

Figure 2:
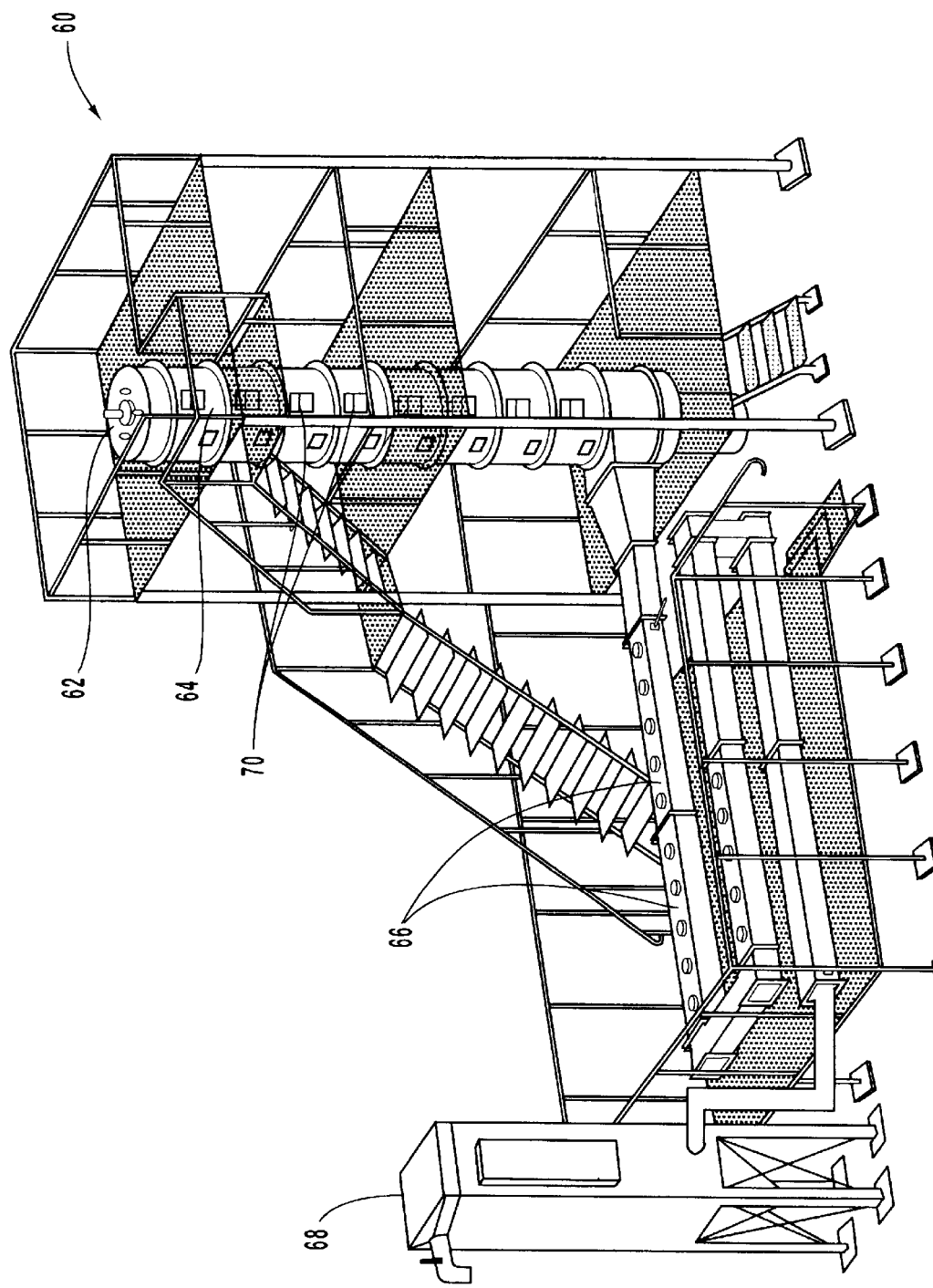
FIG. 2 shows a pilot-scale combustion facility used to demonstrate the methods of the present invention.

Pilot-scale tests were conducted in a 1.0 MMBTU/hr Boiler Simulator Facility (BSF). FIG. 2 is a schematic depiction of a BSF 60 designed to provide an accurate sub-scale simulation of the flue gas temperatures and compositions found in a full-scale boiler. The BSF 60 includes a burner 62, a vertically down-fired radiant furnace 64, a horizontal convective pass 66 extending from furnace 64, and a baghouse 68 in communication with convective pass 66. The burner 62 is a variable swirl diffusion burner with an axial fuel injector, and is used to simulate the approximate temperature and gas composition of a commercial burner in a full-scale boiler. Primary air is injected axially, while the secondary air stream is injected radially through the swirl vanes (not shown) to provide controlled fuel/air mixing. The swirl number can be controlled by adjusting the angle of the swirl vanes. Numerous access ports 70 located along the axis of the facility allow access for supplementary equipment such as reburn injectors, additive injectors, overfire air injectors, and sampling probes.

The radiant furnace 64 is constructed of eight modular refractory lined sections with an inside diameter of 22 inches and a total height of 20 feet. The convective pass 66 is also refractory lined, and contains air cooled tube bundles to simulate the superheater and reheater sections of a utility boiler. Heat extraction in radiant furnace 64 and convective pass 66 can be controlled such that the residence time-temperature profile matches that of a typical full-scale boiler. A suction pyrometer (not shown) is used to measure furnace gas temperatures.

Both natural gas and pulverized coal were tested as main fuels. For the natural gas tests, the initial $NO_x$ concentration was set at 600 ppm by adding ammonia to the combustion air. Previous work has shown that this generates a controllable concentration of $NO_x$ with negligible ammonia slip. With coal, no effort was made to control the initial $NO_x$ concentration. Natural gas was used as the reburning fuel in all tests. The reburning fuel injector was elbow-shaped, and was installed along the centerline of the furnace, aligned in the direction of gas flow. Overfire air was injected through an elbow-shaped injector to burn out combustibles generated in the reburning zone. Dry powders were added by pneumatically transporting them to the furnace and injecting them through an axial injector. Solutions were injected by atomizing them with a twin-fluid nozzle.

A continuous emissions monitoring system (CEMS) was used for on-line flue gas analysis. The CEMS consisted of a heated sample line, sample conditioning system (to remove moisture and particulates), and gas analyzers. Species analyzed included $O_2$, $NO_x$, CO, $CO_2$, and $N_2O$.

Examples 2–10 below describe various test results obtained using the BSF described above. In the Examples that follow, "$SR_1$", "$SR_2$" and "$SR_3$" indicate the stoichiometric ratio of fuel to oxygen in the main combustion zone, the reburning zone, and the burn out zone, respectively.

EXAMPLE 2

Sodium and calcium-containing additives were co-injected with the main fuel in the presence and absence of reburning. 100 ppm of sodium was added as $Na_2CO_3$, and 100 ppm of calcium as $Ca(CH_3COO)_2$. The BSF conditions used were as follows:

| | |
|---|---|
| Main Fuel: | Natural Gas @ 712,500 BTU/hr |
| $SR_1$: | 1.10 |
| $SR_2$: | 0.90 w/$N_2$ |

-continued

| | |
|---|---|
| $SR_3$: | 1.15 |
| $NO_x$: | 600 ppm as measured |
| Reburn Fuel: | natural gas (18% heat input) |
| OFA: | 2150° F. |

Figure 3:
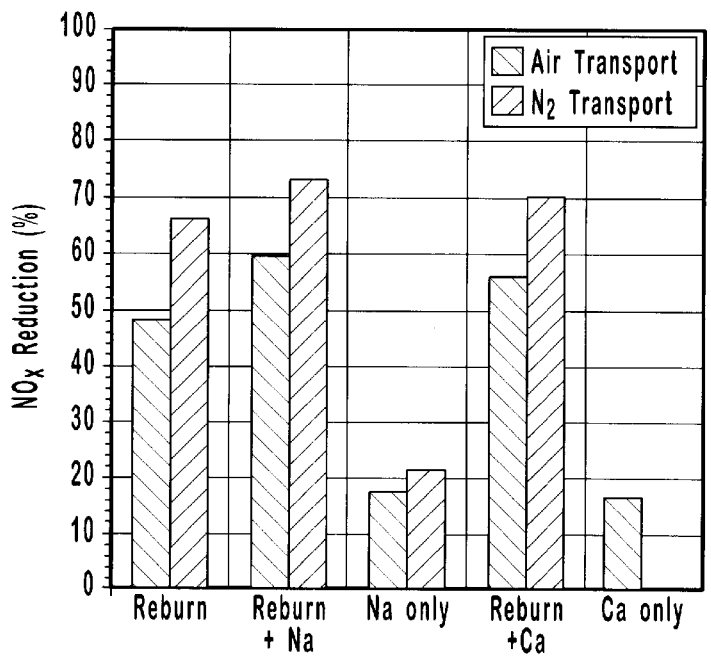
FIG. 3 is a graph showing the effect of sodium and calcium compounds co-injected with the main fuel in the presence and in the absence of reburning.

Air and bottled nitrogen were used as transport media for natural gas injection. FIG. 3 shows the percent reduction of $NO_x$ for both metal-containing additives, in the presence and in the absence of reburning. Injection of metal compounds in the absence of reburning resulted in 16% to 21% $NO_x$ reduction. Reburning itself provided a 48% and 66% $NO_x$ reduction with air and nitrogen transport, respectively. Injection of 100 ppm of metal compounds with the main fuel provided an additional 4–11 percentage points of $NO_x$ reduction. Thus, results presented in FIG. 3 illustrate that sodium- and calcium-containing additives, upon being added into the main combustion zone, are capable of reducing $NO_x$ emissions in the presence and in the absence of reburning.

EXAMPLE 3

Figure 4:
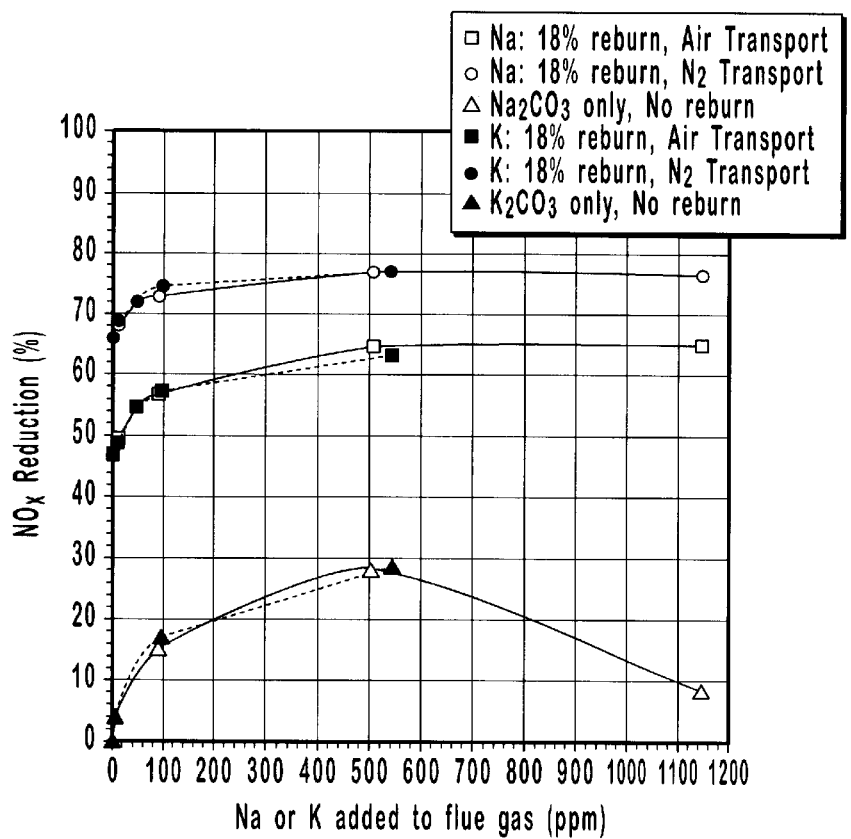
FIG. 4 is a graph showing the effect of sodium and potassium-containing additives co-injected with the main fuel as a function of additive concentration.

The experiment of Example 2 was repeated, using sodium- and potassium-containing metal additives co-injected with the main fuel, as a function of additive concentration. Sodium was added at concentrations ranging from 0 ppm to about 1150 ppm in the form of $Na_2CO_3$, and potassium was added from 0 ppm to about 550 ppm in the form of $K_2CO_3$. The results shown in FIG. 4 indicate that addition of sodium and potassium compounds to the main fuel have similar effects on $NO_x$ reduction. In the absence of reburning, up to approximately 28% $NO_x$ reduction was achieved at 500–550 ppm of Na or K. The additives also improved the efficiency of reburning by 11 percentage points with $N_2$ transport and 18 percentage points with air transport. Thus, results presented in FIG. 4 illustrate that metal additives, upon being added into the main combustion zone, are capable of reducing $NO_x$ emissions in the presence and in the absence of reburning, over a range of additive concentrations.

EXAMPLE 4

Metal-containing additives were injected into the reburning zone instead of into the main combustion zone. The BSF conditions were as follows:

| | |
|---|---|
| Main Fuel: | Natural Gas @ 712,500 BTU/hr |
| $SR_1$: | 1.10 |
| $SR_3$: | 1.15 |
| $NO_x$: | 600 ppm as measured |
| Reburn Fuel: | natural gas (18% heat input) |
| OFA: | 2150° F. |

Figure 5:
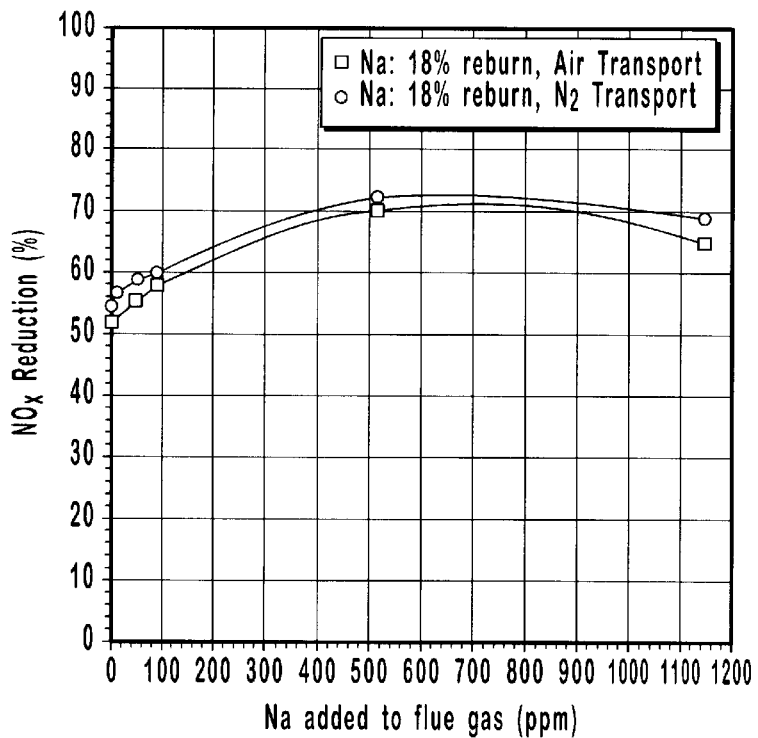
FIG. 5 is a graph showing the effect of a sodium carbonate additive co-injected with the reburning fuel as a function of additive concentration.

Sodium, in the form of $Na_2CO_3$, was injected along with the reburn fuel, at various concentrations ranging from 0 ppm to about 1150 ppm. The results are shown in FIG. 5. Injection of sodium carbonate in the reburning zone improves $NO_x$ control efficiency by up to 18 percentage points. This result was particularly surprising, since the enhanced $NO_x$ control was observed in the absence of N-agents.

EXAMPLE 5

Iron waste compounds were used as the metal-containing additive in the combustion zone. 1000 ppm of iron in the form of $Fe_2O_3$ waste powder was injected along with the main fuel in the combustion zone, under the following conditions:

| | |
|---|---|
| Main Fuel: | Natural Gas @ 712,500 BTU/hr |
| $SR_1$: | 1.10 |
| $SR_3$: | 1.15 |
| $NO_x$: | 600 ppm as measured |
| Reburn Fuel: | natural gas (18% or 25% heat input) |
| OFA: | 2150° F. |

Figure 6:
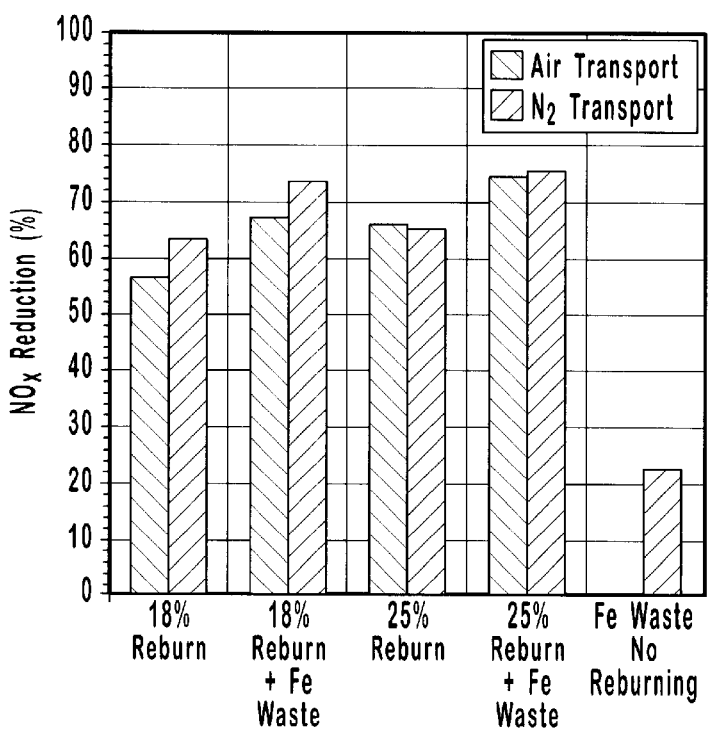
FIG. 6 is a graph showing the effect of iron waste additives co-injected with the main fuel in the presence and in the absence of reburning.

The results are shown in FIG. 6. In the absence of reburning, approximately 23% $NO_x$ reduction was achieved by iron injection. Reburning without additives resulted in 56% and 63% $NO_x$ reduction for 18% reburning and 66% and 67% $NO_x$ reduction for 25% reburning. Due to additive injection, the process efficiency was improved by 8–11 percentage points.

EXAMPLE 6

Figure 7:
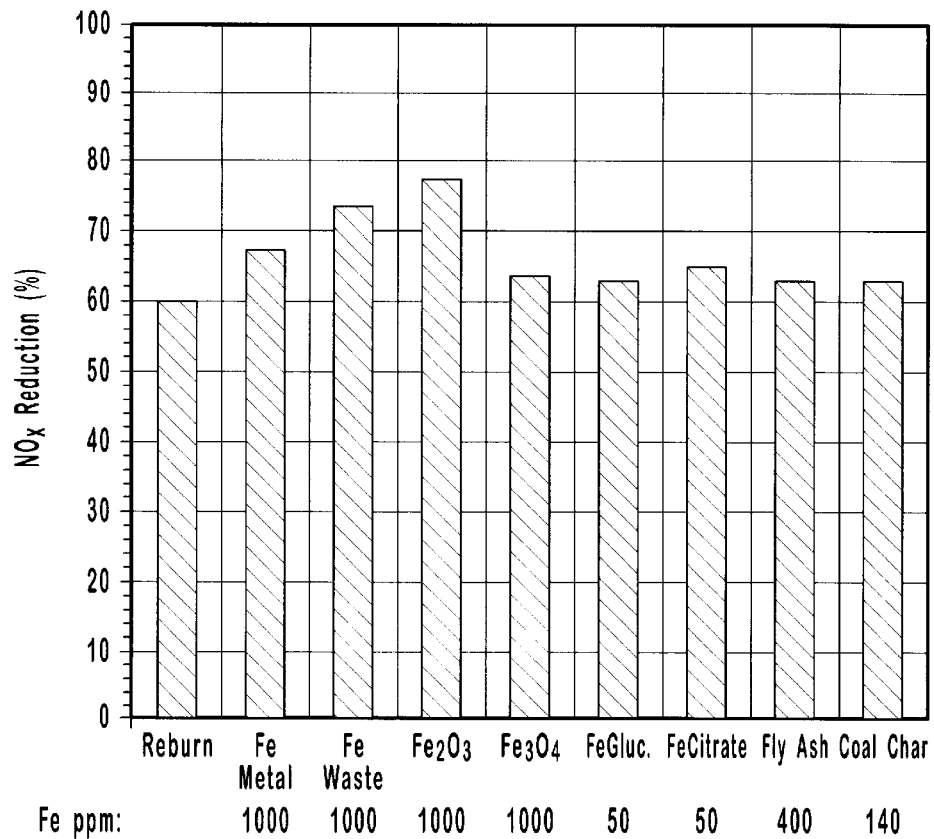
FIG. 7 is a graph showing the effect of iron compounds co-injected with the reburning fuel.

FIG. 7 compares the effect of various iron compounds at various concentrations, co-injected with the reburn fuel, under the following conditions:

| | |
|---|---|
| Main Fuel: | Natural Gas @ 712,500 BTU/hr |
| $SR_1$: | 1.10 |
| $SR_3$: | 1.15 |
| $NO_x$: | 600 ppm as measured |
| Reburn Fuel: | natural gas (18% heat input) |
| Transport: | $N_2$ |
| OFA: | 2150° F. |

Reburning alone provided 60% $NO_x$ reduction. Injection of fly ash from coal firing, as well as coal char, (containing Na, K, Ca, Fe, and other mineral compounds) had minimal effect on $NO_x$ concentration. $NO_x$ reduction due to injection of ash and char was within 2 percentage points of the baseline. However, $Fe_2O_3$ and iron waste (containing about 80% $Fe_2O_3$ and 20% Ca compounds) demonstrated 18 and 14 percentage points improvement, respectively. Iron metal particles and $Fe_3O_4$ particles showed smaller but still significant improvements of 8 and 4 percentage points, respectively. Injection of 50 ppm of organic iron salts, gluconate or citrate, resulted in 4–5 percentage points improvement.

EXAMPLE 7

Figure 8:
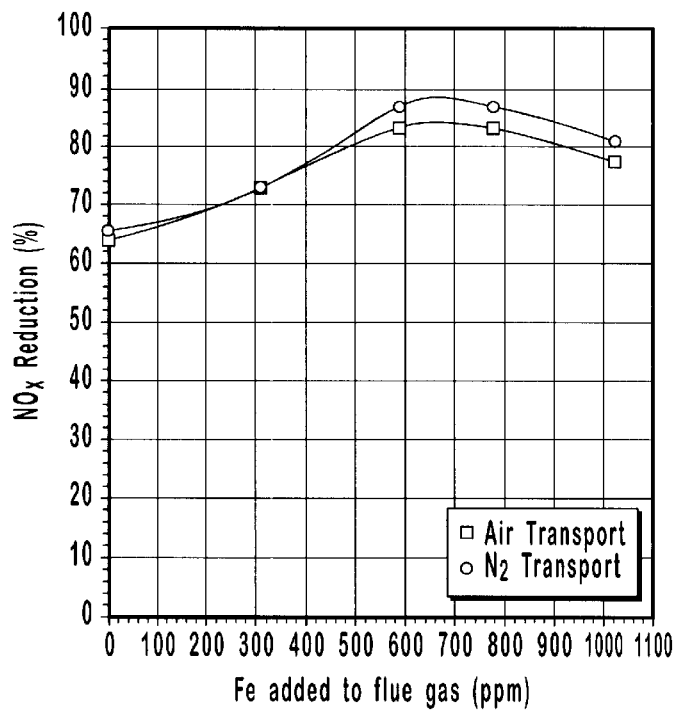
FIG. 8 is a graph showing the effect of an iron oxide additive co-injected with the reburning fuel as a function of additive concentration.

FIG. 8 shows the effect of iron oxide waste co-injected with the reburn fuel as a function of additive concentration, under the following conditions:

| | |
|---|---|
| Main Fuel: | Natural Gas @ 712,500 BTU/hr |
| $SR_1$: | 1.10 |
| $SR_3$: | 1.15 |
| $NO_x$: | 600 ppm as measured |
| Reburn Fuel: | natural gas (25% heat input) |
| OFA: | 2150° F. |

In the absence of the additive, conventional reburning resulted in 64–65% $NO_x$ reduction. A maximum improvement of 20–22 percentage points was achieved at 600 and 770 ppm of the additive in flue gas.

EXAMPLE 8

In the previous Examples, the main fuel oxidized in the BSF was natural gas. In this Example, the effect of metal-containing additives on $NO_x$ reduction using coal as the main fuel was measured. Key differences between coal and natural gas are that coal contains sulfur, ash and mineral compounds that may become volatile at combustion temperatures. A bituminous Utah coal was used that contained 0.67% sulfur and 11.79% ash on a dry basis. Analytical data on mineral compounds in Utah coal is presented in Table 1.

TABLE 1

| Mineral Composition of Utah Coal | | |
|---|---|---|
| Proximate analysis | | |
| Ash | % dry | 11.79 |
| Volatiles | % dry | 41.47 |
| Fixed Carbon | % dry | 46.74 |
| Moisture | % as fired | 4.76 |
| Ultimate analysis | | |
| Carbon | % dry | 68.74 |
| Hydrogen | % dry | 4.91 |
| Nitrogen | % dry | 1.35 |
| Sulfur | % dry | 0.67 |
| Oxygen (difference) | % dry | 12.54 |
| Ash | % dry | 11.79 |
| Higher Heating Value | BTU/lb | 12,205 |
| Ash analysis, % dry | | |
| $SiO_2$ | | 61.49 |
| $Al_2O_3$ | | 18.38 |
| $TiO_2$ | | 1.01 |
| $Fe_2O_3$ | | 4.25 |
| CaO | | 4.71 |
| MgO | | 0.70 |
| $K_2O$ | | 1.03 |
| $Na_2O$ | | 1.71 |
| $SO_3$ | | 4.69 |
| $P_2O_5$ | | 0.44 |
| SrO | | 0.21 |
| BaO | | 0.12 |
| $Mn_3O_4$ | | 0.01 |
| Undetermined | | 1.25 |

The initial uncontrolled $NO_x$ concentration generated by this coal was 1200 ppm (corrected to 0% $O_2$, dry basis).

The metal-containing additive used was iron at 800 ppm, in the form of iron oxide waste co-injected with the reburn fuel, under the following conditions:

| | |
|---|---|
| Main Fuel: | Utah Coal @ 712,500 BTU/hr |
| $SR_1$: | 1.10 |
| $SR_3$: | 1.15 |
| $NO_x$: | 1200 ppm at 0% $O_2$ |
| Reburn Fuel: | Natural Gas |
| Transport: | $N_2$ or air |
| OFA: | 2150° F. |

Figure 9:
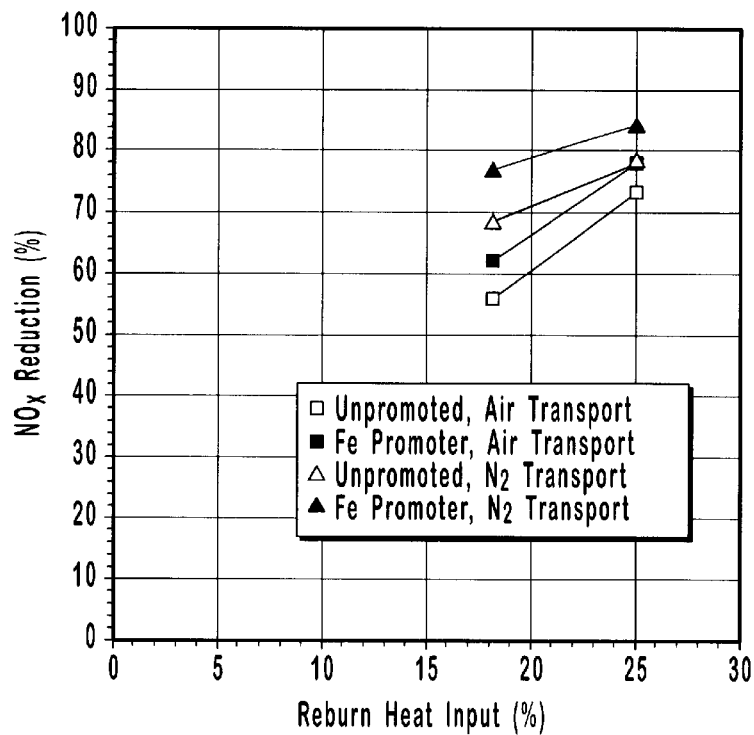
FIG. 9 is a graph showing the effect of iron oxide co-injected with the reburning fuel during coal combustion.

The results are shown in FIG. 9 with and without the additive, with air or $N_2$ transport and at two different reburn heat amounts (18% and 25%). With air as the reburning fuel transport medium, the iron additive caused $NO_x$ reduction to increase by about 5 to 8 percentage points. With nitrogen transport, the additive caused $NO_x$ reduction to increase by about 6 to 9 percentage points. The maximum observed $NO_x$ reduction efficiency with coal firing was 84%, with a 25% natural gas reburn and $N_2$ transport.

Comparing FIGS. 7 and 9, it is apparent that the metal additives are much more effective than the compounds of the same metals present in coal, char and fly ash. As follows from Table 1, the concentration of iron, sodium, and potassium from coal in flue gas (if all metals are released in atomic form) would be approximately 205 ppm, 213 ppm, and 86 ppm, respectively. However, their effect on $NO_x$ reduction is, as shown in FIG. 7, only 1–2 percentage points. The negligible effect of these metals can be explained by the difference in the chemical nature of metal compounds in the additives versus the coal/char/ash. Although traditional coal, char, and ash mineral analyses present the composition in the form of metal oxides, the oxides are not the actual forms of these metals in coal. Instead, the metals are mainly present in the form of sulfides and silicate and aluminosilicate matrixes. These compounds are not effective in reactions with combustion radicals and have relatively small effect on $NO_x$ reduction.

Thus, results presented in FIGS. 5–8 illustrate the surprising and unexpected finding that iron-containing additives, upon being added into the main combustion zone and the reburning zone, are capable of reducing $NO_x$ emissions.

EXAMPLE 9

The metal-containing additives of the present invention can be added in the combustion zone or in the reburn zone, as described and illustrated above, or can be added in both zones. Thus, in this Example, an iron-containing compound was added with the main fuel in the combustion zone, with the reburn fuel in the reburn zone, and in both zones. The conditions used were as follows:

| Main Fuel: | Natural Gas @ 712,500 BTU/hr |
|---|---|
| $SR_1$: | 1.10 |
| $SR_3$: | 1.15 |
| $NO_x$: | 600 ppm as measured |
| Reburn Fuel: | Natural Gas (18% heat input) |
| Transport: | $N_2$ or air |
| OFA: | 2150° F. |

1170 ppm of iron was added in the form of $Fe_2O_3$. The total amount of iron added was kept constant at 1170 ppm when the additive was added with both fuels by adding 600 ppm with the main fuel and the remaining 570 ppm with the reburn fuel. The results are shown in FIG. 10.

Figure 10:
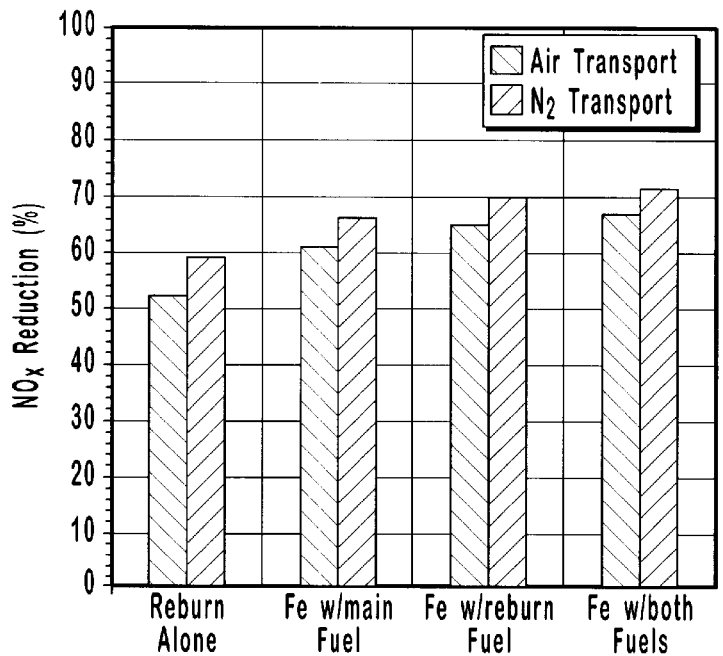
FIG. 10 is a graph showing the effect of iron oxide injected in both the main combustion zone and the reburning zone.

FIG. 10 shows that addition of an iron compound in both zones can provide higher $NO_x$ reduction than injection of the same amount of the additive in only one of the zones. Under the conditions described above, conventional reburning resulted in 52% and 59% $NO_x$ reduction for air and nitrogen transport, respectively. Injection of the iron additive with the main fuel, with the reburning fuel, and with both fuels demonstrated a gradual increase in $NO_x$ reduction up to about 72%.

EXAMPLE 10

The metal-containing additives of the present invention are effective at reducing $NO_x$ emissions under fuel-lean conditions as well. Thus, in this Example, the following conditions were used:

| Main Fuel: | Natural Gas @ 712,500 BTU/hr |
|---|---|
| $SR_1$: | 1.10 |
| $NO_x$: | 600 ppm as measured |
| Reburn Fuel: | Natural Gas (6% heat input) |
| Transport: | $N_2$ |
| OFA: | None |

Figure 11:
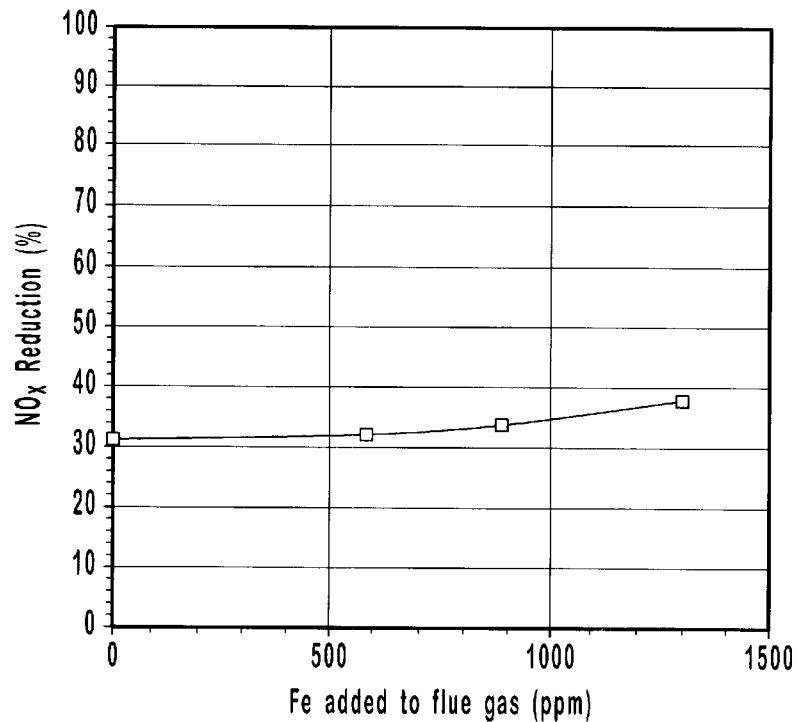
FIG. 11 is a graph showing the effect of an iron oxide additive as a function of additive concentration for fuel-lean reburning without overfire air injection.

Iron at several different concentrations in the form of $Fe_2O_3$ was used as the metal-containing additive, and was co-injected with the reburn fuel. The results are shown in FIG. 11.

Only 6% reburning fuel was injected, and since the total composition of the mixture was fuel-lean, no overfire air was injected. The reduction of $NO_x$ gradually improves with addition of the additive from 32% (with no additive) to 38% (with about 1300 ppm Fe). This result demonstrates that the effect of additives is still significant under conditions of low amounts of reburning fuel and in the absence of overfire air.

EXAMPLE 11

Although the methods of the present invention surprisingly provide enhanced $NO_x$ reduction without regard to any particular theoretical model or chemical mechanism, kinetic modeling does help to understand the effect of additives. Thus, without wishing to be bound by theory, the following comments and examples are presented in order to more fully illustrate the inventors' own understanding of the chemistry that may be responsible for the surprising and unexpected features of the present invention.

In kinetic modeling, a set of chemical reactions representing the interaction of reactive combustion species and additives is assembled. Each reaction is assigned a set of kinetic and thermodynamic constants, including a rate constant and heat release or heat loss parameters. Numerical solution of a set of differential equations for the time-dependent concentrations of the reagents makes it possible to predict the concentration-time curves for all reacting species under selected process conditions. Using this kinetic modeling approach confirmed that injection of metal-containing species according to the methods described herein results in a significant improvement in $NO_x$ reduction.

Figure 12:
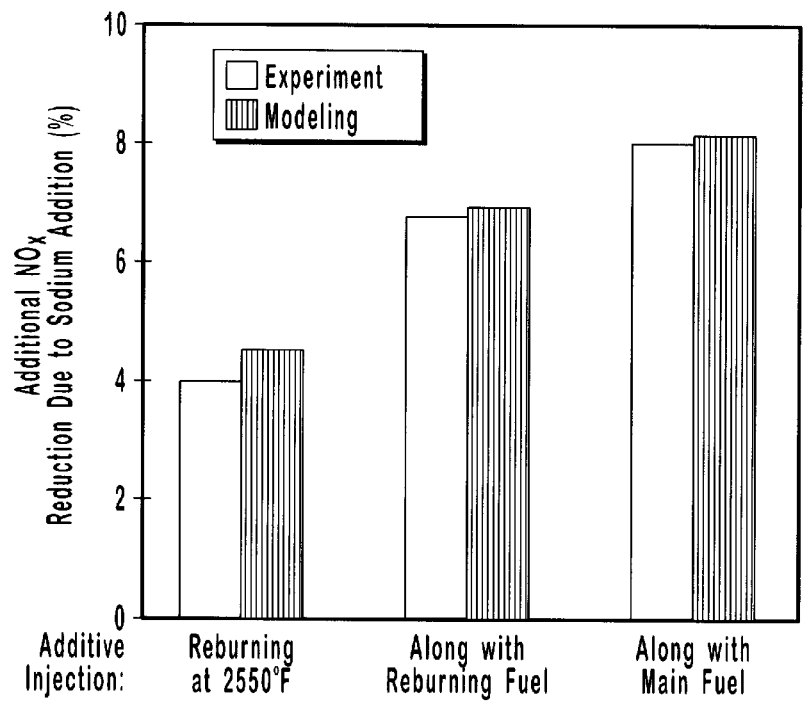
FIG. 12 is a graph comparing experimental and theoretical modeling results on sodium injection for enhanced $NO_x$ reduction.

FIG. 12 compares the experimental data and modeling results for $NO_x$ reduction due to sodium injection (100 ppm Na, 18% reburn). The modeling results show good agreement with experimental data for all locations of additive injection. Both modeling and experimental data show that the additive is most effective when added with the main fuel, whereas the addition along with the reburning fuel is slightly less effective.

Modeling predicts that addition of sodium carbonate along with the reburning fuel results in its fast decomposition and reaction with water to form sodium hydroxide (NaOH) and some sodium atoms. They participate in a chain reaction with active species, H and OH, resulting in enhanced $NO_x$ reduction. Modeling suggests that the effect of sodium additives on $NO_x$ concentration can be explained as follows. Addition of sodium results in a decrease of radical concentrations during the reburning process. It was observed in modeling that the fuel is oxidized during the early part of the reaction with and without sodium addition. However, in the presence of sodium, the fuel is oxidized over a longer period of time. Fuel oxidation generates hydrocarbon-containing radicals, which reduce NO to $N_2$. At the same time, the hydrocarbon radicals react with other non-carbon atoms and radicals (H, OH, O, etc.) and are transformed into other products. In the presence of sodium, the concentration of non-carbon radicals is smaller, and the rate of reaction of hydrocarbon radicals with non-carbon radicals decreases, which results in a higher rate of the reaction of hydrocarbon radicals with NO. Thus, modeling suggests that the effect of sodium addition can be explained by removal of non-carbon radicals by sodium species.

Modeling predicts that removal of radicals can occur through the following chain reaction:

$$NaOH + H \rightarrow Na + H_2O \tag{1}$$

$$Na + O_2 + M \rightarrow NaO_2 + M \tag{2}$$

$$NaO_2 + OH \rightarrow NaOH + O_2 \tag{3}$$

where M represents any third body collision partner. The net action of sodium species in reactions (1)–(3) is equivalent to the conversion of H atoms and OH radicals into $H_2O$.

$$\text{Net: } H + OH = H_2O \tag{4}$$

EXAMPLE 12

Figure 13:
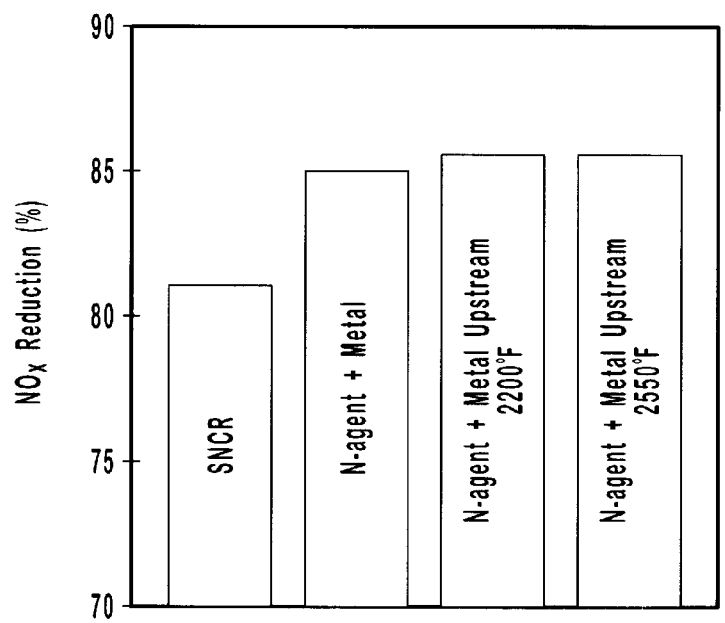
FIG. 13 is a graph showing kinetic modeling results on the effect of sodium injection at different locations on $NO_x$ reduction in the presence of an N-agent.

FIG. 13 shows modeling predictions for the use of an N-agent in conjunction with the metal-containing additives. The metal-containing additive was sodium carbonate (30 ppm), and the N-agent was ammonia. The first bar shows that under selected conditions injection of N-agent alone (i.e., the conventional SNCR process, T=1670° F.) provides 81.5% NO reduction. Addition of sodium to the N-agent, such as is disclosed in U.S. Pat. No. 5,756,059, results in 85% NO control ($2^{nd}$ bar). It was surprisingly found that the sodium additive can also be injected separately from the N-agent at even higher temperature (as shown in FIG. 13 at 2200° F. and 2550° F.; $3^{rd}$ and $4^{th}$ bars). This provides slightly higher NO reduction. Modeling shows that the metal additive can proceed with the stream of flue gas to lower temperature and can enhance the interaction of NO and the N-agent in the SNCR zone.

EXAMPLE 13

Figure 14:
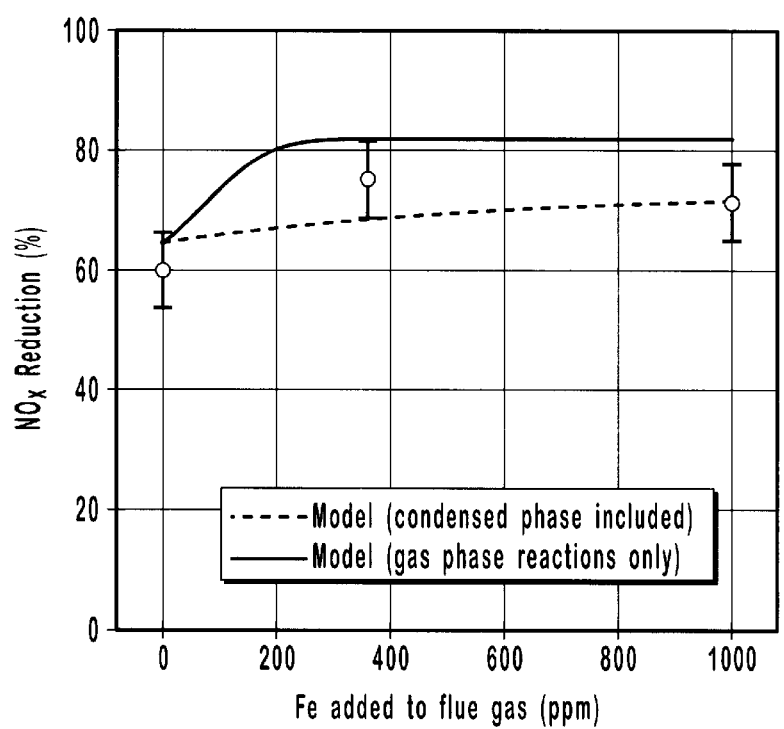
FIG. 14 is a graph comparing experimental and theoretical modeling results on iron injection for enhanced $NO_x$ reduction.

FIG. 14 represents modeling predictions for iron injection with the reburning fuel (18% reburn). The symbols represent the scatter of experimental data for all iron additives used. The first calculation (solid line) was performed with the assumption that the iron additive evaporates completely upon injection and no condensed phase is present in the reburning zone. In this case, modeling predicts a stronger promotional effect than that found in experiments. A possible explanation of this observation is that the metal-containing additive does not evaporate completely upon injection, and part of it is present in the condensed phase. Indeed, it is known that at temperatures of around 1700 K the most stable form of FeO (one of the species in the mechanism) is its liquid phase.

Thermodynamic calculations were conducted to define equilibrium concentrations of Fe species in the gas and liquid phase. Thermodynamic data and codes presented by Feitelberg, *CET98 for the Macintosh: A Chemical Equilibrium and Transport Properties Calculator*, General Electric Company (1994), were used. Results show that indeed significant amounts of Fe-species are present in the condensed phase. Taking into account the condensed phase in modeling significantly reduces the concentration of iron-containing species in the gas phase. Modeling of the iron-promoted reburning process with both gas and condensed phases of the additive present in equilibrium amounts shows a significant decrease in the effect of iron compounds on $NO_x$ reduction (FIG. 14, dashed line), due to the condensation of the additive into the liquid phase. It was assumed that the liquid phase of the additive is chemically inert and does not contribute to $NO_x$ reduction. One can see that the experimental trends, such as increased $NO_x$ reduction in the presence of iron additives and the dependence on iron concentration, are in qualitative agreement with experiments.

Modeling suggests the following explanation of the effect of iron on $NO_x$ reduction. The presence of iron species results in a decrease of H-atom concentrations via the catalytic cycle (5)–(7):

$$FeOH + H \rightarrow FeO + H_2 \tag{5}$$

$$FeO + H_2O \rightarrow Fe(OH)_2 \tag{6}$$

$$Fe(OH)_2 + H \rightarrow FeOH + H_2O \tag{7}$$

$$\text{Net: } H + H \rightarrow H_2 \tag{8}$$

Rate constants for reactions (5)–(7) were obtained by Rumminger et al., "Numerical Study of the Inhibition of Premixed and Diffusion Flames by Iron Pentacarbonyl," *Combustion and Flame*, 116, 207–219 (1999), by fitting calculated H atom concentration profiles to the experimental measurements in flames doped with $Fe(CO)_5$. Concentrations of the species OH and O are driven toward thermodynamic equilibrium by the fast reaction $$H + O_2 \rightarrow OH + O \tag{9}$$

Thus, the presence of iron compounds in the gas phase can reduce total radical concentration through reactions (5), (6) and (7). This iron-catalyzed removal of non-carbon radicals reduces the kinetic competition for carbon-containing radicals, thereby increasing the rate of $NO_x$ removal.

Modeling results suggest that reactions of metal-containing species in the gas phase can qualitatively explain the effect of metals on $NO_x$ reduction. This conclusion is a strong indication that the observed promotional effect on $NO_x$ reduction is at least partially explained by the homogeneous reactions of metal species. However, due to the uncertainties in the metal sub-mechanisms and lack of kinetic data on reactions of some metal-containing species, a potential effect of heterogeneous reactions on the surface of injected particles cannot be excluded.

The invention may be embodied in various specific forms without departing from its spirit or essential characteristics. The above mentioned embodiments are to be considered in all respects only as illustrative and not restrictive. Further, it should be appreciated that the theoretical explanations and modeling results presented herein are merely illustrative of the present understanding of the chemical reactions involved, but the invention is not limited thereby. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for decreasing the concentration of nitrogen oxides in a combustion flue gas, comprising the steps of:
    (a) providing a combustion zone adapted to react a combustible fuel and an oxidizing agent;
    (b) adding the combustible fuel and the oxidizing agent to the combustion zone to produce a combustion flue gas including nitrogen oxides;
    (c) adding a reburning fuel to the combustion flue gas downstream from the combustion zone to form a reburning zone;
    (d) introducing a metal-containing additive into the reburning zone without adding a nitrogenous reducing agent;
    (e) allowing the metal-containing additive to react within the combustion flue gas in the reburning zone to decrease the concentration of nitrogen oxides therein; and (f) adding a nitrogenous reducing agent to the combustion flue gas after step (e) and in a region downstream of the reburning zone having a temperature of about 1100° F. to about 2300° F.;

wherein the combustion flue gas proceeds in a downstream direction away from the combustion zone and through the reburning zone.

2. A method for decreasing the concentration of nitrogen oxides in a combustion flue gas, comprising the steps of:

(a) providing a combustion zone adapted to react a combustible fuel and an oxidizing agent;

(b) adding the combustible fuel and the oxidizing agent to the combustion zone to produce a combustion flue gas including nitrogen oxides;

(c) adding a reburning fuel to the combustion flue gas downstream from the combustion zone to form a reburning zone;

(d) introducing a metal-containing additive into the reburning zone without adding a nitrogenous reducing agent;

(e) allowing the metal-containing additive to react within the combustion flue gas in the reburning zone to decrease the concentration of nitrogen oxides therein;

(f) adding overfire air in one or more stages to the combustion flue gas downstream from the reburning zone to form a burnout zone having a temperature of about 1100° F. to about 2500° F.; and (g) adding a nitrogenous reducing agent to the combustion flue gas in a region downstream of the reburning zone having a temperature of about 1100° F. to about 2300° F.

3. A method for decreasing the concentration of nitrogen oxides in a combustion flue gas, comprising the steps of:

(a) providing a combustion zone adapted to react a combustible fuel and an oxidizing agent;

(b) adding the combustible fuel and the oxidizing agent to the combustion zone to produce a combustion flue gas including nitrogen oxides;

(c) adding a reburning fuel to the combustion flue gas downstream from the combustion zone to form a reburning zone;

(d) introducing a metal-containing additive into the reburning zone without adding a nitrogenous reducing agent;

(e) allowing the metal-containing additive to react within the combustion flue gas in the reburning zone to decrease the concentration of nitrogen oxides therein; and (f) adding overfire air in one or more stages to the combustion flue gas downstream from the reburning zone to form a burnout zone having a temperature of about 1100° F. to about 2500° F.

4. A method for decreasing the concentration of nitrogen oxides in a combustion flue gas, comprising the steps of:

(a) providing a combustion zone adapted to react a combustible fuel and an oxidizing agent;

(b) adding the combustible fuel and the oxidizing agent to the combustion zone to produce a combustion flue gas including nitrogen oxides;

(c) adding a reburning fuel to the combustion flue gas downstream from the combustion zone to form a reburning zone, the reburning zone having a substantially fuel rich condition;

(d) introducing a metal-containing additive into the reburning zone without adding a nitrogenous reducing agent, wherein the metal-containing additive is present in an amount from about 1 ppm to about 10,000 ppm, based on molar concentration; and (e) allowing the metal-containing additive to react within the combustion flue gas in the reburning zone to decrease the concentration of nitrogen oxides therein.

5. The method of claim 4, wherein the combustible fuel is selected from group consisting of coal, natural gas, oil, biomass, municipal waste products, industrial waste products, pyrolysis products, gasification products, and mixtures thereof.

6. The method of claim 4, wherein the oxidizing agent is selected from the group consisting of air, oxygen, recirculated flue gas, and mixtures thereof.

7. The method of claim 4, wherein the metal-containing additive comprises a metal selected from the group consisting of lithium, sodium, potassium, magnesium, barium, calcium, zinc, aluminum, manganese, iron, cobalt, nickel, copper, molybdenum, ruthenium, rhodium, palladium, silver, gold, cadmium, indium, tin, osmium, iridium, chromium, titanium, vanadium, cesium, platinum, and alloys, combinations, and mixtures thereof.

8. The method of claim 7, wherein the metal is part of a compound selected from the group consisting of oxides, hydroxides, carbonates, inorganic salts, organic salts, metal-containing organic compounds, metalorganics, and mixtures or combinations thereof.

9. The method of claim 4, wherein the metal-containing additive is in the form of a solid particulate, a liquid, a solution, a suspension, a slurry, a molten substance, or a gas that is distributed by nitrogen, stearn, air, recirculation gases, or mixtures thereof.

10. The method of claim 4, wherein the metal-containing additive is combined with the reburning fuel prior to being introduced into the reburning zone.

11. The method of claim 4, wherein the metal-containing additive is in the form of particles having an average particle size of about 0.1 $\mu$m to about 10,000 $\mu$m.

12. The method of claim 4, wherein the combustion zone has a temperature of about 1500° F. to about 3500° F., and the combustible fuel and the oxidizing agent are provided to the combustion zone in a fuel to oxidizing agent ratio of about 1.3 to about 0.75.

13. The method of claim 4, wherein the reburning zone has a temperature of about 1500° F. to about 3000 ° F., and the reburning fuel is added in an amount such that the ratio of reburning fuel to oxidizing agent in the reburning zone is about 1.1 to about 0.75.

14. The method of claim 4, wherein the step of allowing the metal-containing additive to react within the combustion flue gas is carried out for a time period of about 0.01 to about 10 seconds.

15. The method of claim 4, wherein the metal-containing additive is formed from one or more precursors that are constituent parts of a fuel, or formed or released from a fuel by a process selected from the group consisting of pyrolysis, gasification, physical separation, and chemical separation.

16. The method of claim 4, wherein the combustion flue gas proceeds in a downstream direction away from the combustion zone and through the reburning zone, and wherein the method further comprises the step of adding overfire air in one or more stages to the combustion flue gas downstream from the reburning zone to form a burnout zone having a temperature of about 1100° F. to about 2500° F.

17. The method of claim 4, wherein the combustion flue gas proceeds in a downstream direction away from the combustion zone and through the reburning zone, and wherein the method further comprises the step of adding a nitrogenous reducing agent to the combustion flue gas after step (e) and in a region downstream of the reburning zone having a temperature of about 1100° F. to about 2300° F.

18. The method of claim 17, wherein the nitrogenous reducing agent is added to the combustion flue gas in an amount of about 0.5 moles to about 3 moles of nitrogenous reducing agent per mole of nitrogen oxides.

19. The method of claim 17, wherein the nitrogenous reducing agent is selected from the group consisting of ammonia, urea, cyanuric acid, ammonium sulfate, hydrazine, thanolamine, ammonium bisulfite, ammonium bisulfate, ammonium formate, ammonium carbonate, ammonium bicarbonate, biuret, triuret, ammelide, and mixtures thereof.

20. The method of claim 4, further comprising the steps of adding overfire air in one or more stages to the combustion flue gas downstream from the reburning zone to form a burnout zone having a temperature of about 1100° F. to about 2500° F., and adding a nitrogenous reducing agent to the combustion flue gas in a region downstream of the reburning zone having a temperature of about 1100° F. to about 2300° F.

21. The method of claim 20, wherein the nitrogenous reducing agent is added to the combustion flue gas in an amount of about 0.5 moles to about 3 moles of nitrogenous reducing agent per mole of nitrogen oxides.

22. The method of claim 20, wherein the nitrogenous reducing agent is selected from the group consisting of ammonia, urea, cyanuric acid, ammonium sulfate, hydrazine, thanolamine, ammonium bisulfite, ammonium bisulfate, ammonium formate, ammonium carbonate, ammonium bicarbonate, biuret, triuret, ammelide, and mixtures thereof.

* * * * *

UNITED STATES PATENT AND TRADEMARK OFFICE
CERTIFICATE OF CORRECTION

PATENT NO. : 6,471,506 B1
DATED : October 29, 2002
INVENTOR(S) : Vladimir M. Zamansky et al.

It is certified that error appears in the above-identified patent and that said Letters Patent is hereby corrected as shown below:

Column 1,
Line 50, change "NOx" to -- $NO_x$ --

Column 2,
Line 60, change "$N_2$ + H" to -- $N_2O$ + H --

Column 10,
Line 12, change "another" to -- a further --

Column 11,
Line 52, change "m ain" to -- main --
Line 53, change "z one" to -- zone --
Line 53, change "burn out" to -- burnout --

Column 20,
Line 8, after "from" insert -- the --

Signed and Sealed this

Twenty-seventh Day of May, 2003

JAMES E. ROGAN
*Director of the United States Patent and Trademark Office*